(12) United States Patent
Park

(10) Patent No.: US 11,537,491 B2
(45) Date of Patent: Dec. 27, 2022

(54) ELECTRONIC APPARATUS AND METHOD OF CONTROLLING THE SAME

(71) Applicant: SAMSUNG ELECTRONICS CO., LTD., Suwon-si (KR)

(72) Inventor: Dongseob Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/281,746

(22) PCT Filed: Dec. 9, 2019

(86) PCT No.: PCT/KR2019/017280
§ 371 (c)(1),
(2) Date: Mar. 31, 2021

(87) PCT Pub. No.: WO2020/122522
PCT Pub. Date: Jun. 18, 2020

(65) Prior Publication Data
US 2021/0397532 A1    Dec. 23, 2021

(30) Foreign Application Priority Data

Dec. 10, 2018 (KR) ........................ 10-2018-0158249

(51) Int. Cl.
*G06F 15/173* (2006.01)
*G06F 11/30* (2006.01)
*G06F 11/34* (2006.01)

(52) U.S. Cl.
CPC ...... *G06F 11/3075* (2013.01); *G06F 11/3006* (2013.01); *G06F 11/3082* (2013.01); *G06F 11/3476* (2013.01)

(58) Field of Classification Search
None
See application file for complete search history.

(56) References Cited

U.S. PATENT DOCUMENTS 9,407,652 B1    8/2016 Kesin et al.
9,514,248 B1   12/2016 Guan et al.
(Continued)

FOREIGN PATENT DOCUMENTS

KR   10-2013-0089959 A      8/2013
KR      20130089959 A  *   8/2013
(Continued)

OTHER PUBLICATIONS

Communication dated Oct. 14, 2021 by the European Patent Office in European Patent Application No. 19897232.5.
(Continued)

*Primary Examiner* — Anh Nguyen
(74) *Attorney, Agent, or Firm* — Sughrue Mion, PLLC

(57) ABSTRACT

The disclosure relates to an electronic apparatus and a method of controlling the same. The electronic apparatus includes: a communication interface; and a processor configured to receive log data of a plurality of devices connected to a network through the communication interface, acquire operation time information of each of the devices from the received log data, calculate similarity of the operation time between the plurality of devices based on the acquired operation time information, and determine a device group including two or more devices with relatively high calculated similarity among the plurality of devices.

15 Claims, 13 Drawing Sheets

(56) References Cited

U.S. PATENT DOCUMENTS

| | | |
|---|---|---|
| 2011/0305439 A1 | 12/2011 | Chaudhuri et al. |
| 2015/0112767 A1* | 4/2015 | Shatzkamer ....... G06Q 30/0205 |
| | | 705/7.34 |
| 2016/0359872 A1 | 12/2016 | Yadav et al. |
| 2017/0286190 A1 | 10/2017 | Ishakian et al. |
| 2017/0293666 A1 | 10/2017 | Ragavan et al. |
| 2019/0327164 A1* | 10/2019 | Kim ................... H04L 43/0894 |

FOREIGN PATENT DOCUMENTS

| | | |
|---|---|---|
| KR | 10-1817011 B1 | 1/2018 |
| KR | 101817011 B1 * | 9/2018 |
| WO | 2016/075915 A1 | 5/2016 |

OTHER PUBLICATIONS

Kiveris et al., "Connected Components in MapReduce and Beyond," SoCC '14, Nov. 2014, 13 pages.

International Search Report (PCT/ISA/210) dated Apr. 3, 2020, issued by the International Searching Authority in International Application No. PCT/KR2019/017280.

Communication dated Oct. 27, 2022 issued by the European Patent Office in European Patent Application No. 19897232.5.

\* cited by examiner

FIG. 6

| Device ID | IP | Timestamp | |
|---|---|---|---|
| 1 | 10.0.0.1 | 2018-05-01T00:01:00Z | 601 |
| 2 | 10.0.0.1 | 2018-05-01T00:01:00Z | 602 |
| 3 | 10.0.0.3 | 2018-05-01T00:01:00Z | 603 |
| ... | ... | ... | |

FIG. 7

| Device ID | IP | Compressed Time Slot | |
|---|---|---|---|
| 1 | 10.0.0.1 | 1 0 1 0 ••• 1 0 1 0 1 | 701 |
| 2 | 10.0.0.1 | 1 1 1 1 ••• 1 0 1 0 1 | 702 |
| 3 | 10.0.0.3 | 0 0 1 0 ••• 0 0 1 1 1 | |

(00:00, 3:00, 5:00, 10:00, 14:00, 20:00)

| 0 | 1 | 2 | 3 | | 4 | 5 | ... | 10 | 11 | 12 | 13 | 14 | ... | 20 | 21 | 22 | 23 | 24 |
|---|---|---|---|---|---|---|-----|----|----|----|----|----|-----|----|----|----|----|----|
| 1 | 0 | 0 | 1 | | 0 | 1 | ... | 1  | 0  | 0  | 0  | 1  | ... | 1  | 0  | 0  | 0  | 0  |

FIG. 10

| Device ID | Device ID | Score | IP |
|---|---|---|---|
| 1 | 2 | 0.71 | 10.0.0.1 |
| 2 | 3 | 0.3 | 56.34.2.105 |
| 1 | 3 | 0.5 | 19.20.50.23 |
| 4 | 6 | 0.2 | 10.0.0.1 |
| ... | ... | ... | ... |

| IP | Cluster ID | Device IDs | |
|---|---|---|---|
| 10.0.0.1 | 1 | [1, 4, 6, 2, 3] | ~1300 |
| 10.0.0.1 | 2 | [2, 3, 5, 1] | ~1310 |
| 56.34.2.105 | 3 | [2, 3] | ~1320 |
| 56.34.2.105 | 6 | [6, 1, 5] | ~1340 |
| ... | ... | ... | |

ELECTRONIC APPARATUS AND METHOD OF CONTROLLING THE SAME

TECHNICAL FIELD

The disclosure relates to an electronic apparatus and a method of controlling the same, and more particularly, to an electronic apparatus capable of predicting similarity between a plurality of devices connected to a network and a method of controlling the same.

BACKGROUND ART

Big data refers to a large amount of structured or unstructured data set that exceeds capabilities of data collection, storage, management, and analysis of existing database management tools. Big data processing technology collects, stores, manages, and analyzes the large amount of structured or unstructured data set to extract values or analyze desired results.

The relationship between big data and statistics is complementary, and the situations of social or natural groups may be expressed numerically by statistical access to big data. Therefore, the big data processing technology is being applied as a base technology to apply and utilize statistical techniques for a large amount of data.

However, in general, the above statistical figures roughly represent tendency or propensity of a group, and there is a limit in that it is difficult to understand a specific relationship with individuals within a certain region or group. The big data refers to a large amount of structured or unstructured data set that exceeds capabilities of data collection, storage, management, and analysis of the existing database management tools. The big data processing technology collect, store, manage, and analyze the large amount of structured or unstructured data set to extract values or analyze desired results.

The relationship between big data and statistics is complementary, and the situations of social or natural groups may be expressed numerically by statistical access to big data. Therefore, the big data processing technology is being applied as a base technology to apply and utilize statistical techniques for a large amount of data.

However, the above statistical figures roughly represent tendency or propensity of a group, and there may be a limit in that it is difficult to understand a specific relationship with individuals within a certain region or group.

DISCLOSURE

Technical Problem

An object of the disclosure is to provide provides an electronic apparatus capable of generating a device group including a plurality of devices with relatively high similarity in a network by calculating similarity between the devices connected to the network and a method for controlling the same.

Technical Solution

According to an aspect of the present disclosure, an electronic apparatus includes: a communication interface; and a processor configured to receive log data of a plurality of devices connected to a network through the communication interface, acquire operation time information of each of the devices from the received log data, calculate similarity of the operation time between the plurality of devices based on the acquired operation time information, and determine a device group including two or more devices with the relatively high calculated similarity among the plurality of devices.

The processor may extract a timestamp of each of the devices from the received log data, and generate a time index indicating the operation time information from the extracted timestamp, and the time index may include a bitmap-based compressed time slot.

The calculated similarity may have a value between 0 and 1, the processor may determine the device group including a corresponding device when the calculated similarity of the operation time between the plurality of devices is equal to or greater than a predetermined reference value, and remove a corresponding device from the device group when the calculated similarity of the operation time between the plurality of devices is smaller than a predetermined reference value.

The processor may represent the determined device group as a graph in which two or more devices with relatively high similarity are connected to each other. The processor may provide an image represented by the graph to at least one external apparatus through the communication interface or may display the image represented by the graph on a display.

According to another aspect of the present disclosure, a method of controlling an electronic apparatus includes: receiving log data of a plurality of devices connected to a network through a communication interface; acquiring operation time information of each of the devices from the received log data; calculating similarity of the operation time between the plurality of devices based on the acquired operation time information; and determining a device group including two or more devices with the relatively high calculated similarity among the plurality of devices.

The acquiring of the operation time information may include: extracting a timestamp of each of the devices from the received log data; and generating a time index indicating the operation time information from the extracted timestamp, and the time index may include a bitmap-based compressed time slot.

The calculated similarity may have a value between 0 and 1, and the determining of the device group includes determining the device group including a corresponding device when the calculated similarity of the operation time between the plurality of devices is equal to or greater than a predetermined reference value, and the determining of the device group may include removing a corresponding device from the device group when the calculated similarity of the operation time between the plurality of devices is smaller than a predetermined reference value.

The method may further include representing the determined device group as a graph in which two or more devices with the relatively high similarity are connected to each other and providing an image represented by the graph to at least one external apparatus through the communication interface, or displaying the image represented by the graph.

According to still another aspect of the present disclosure, there is provided a computer-readable non-volatile recording medium in which a program of a method executable by a processor of an electronic apparatus is recorded, the method including: receiving log data of a plurality of devices connected to a network through a communication interface; acquiring operation time information of each of the devices from the received log data; calculating similarity of the operation time between the plurality of devices based on the acquired operation time information; and determining a device group including two or more devices with the relatively high calculated similarity among the plurality of devices.

Advantageous Effects

According to the electronic apparatus and the method for controlling the same of the disclosure as described above, by calculating the similarity between the plurality of devices connected to the network and generating the device group including the devices with relatively high similarity in the network, it is possible to understand the relationship of devices in the network and use the understood relationship for marketing such as target services.

DESCRIPTION OF DRAWINGS

FIGS. 6, 7 and 8 are diagrams for explaining a process of acquiring operation time information of a device in the electronic apparatus according to the embodiment of the disclosure.

FIGS. 9 and 10 are diagrams for explaining a process of calculating similarity of an operation time between devices in the electronic apparatus according to the embodiment of the disclosure.

FIGS. 11, 12 and 13 are diagrams for explaining a process of determining a device group in the electronic apparatus according to the embodiment of the disclosure.

MODE FOR DISCLOSURE

Figure 1:
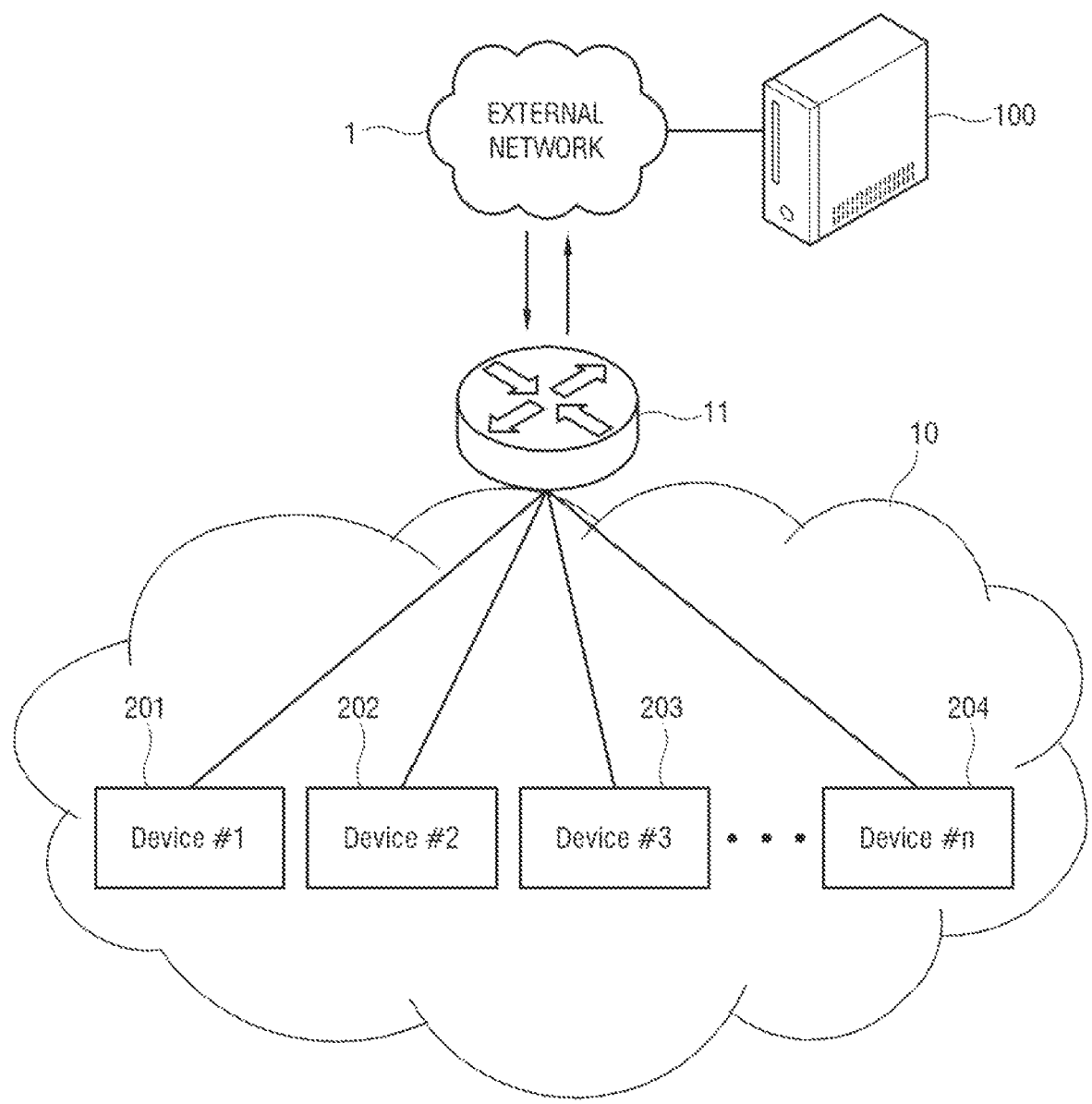
FIG. 1 is a block diagram illustrating a network system according to an embodiment of the disclosure.

Hereinafter, embodiments of the disclosure will be described in detail with reference to the accompanying drawings. In the drawings, the same reference numbers or signs refer to components that perform substantially the same function, and the size of each component in the drawings may be exaggerated for clarity and convenience. However, the technical idea and the core configuration and operation of the disclosure are not limited only to the configuration or operation described in the following examples. In describing the disclosure, if it is determined that a detailed description of the known technology or configuration related to the disclosure may unnecessarily obscure the subject matter of the disclosure, the detailed description thereof will be omitted.

In embodiments of the disclosure, terms including ordinal numbers such as first and second are used only for the purpose of distinguishing one component from other components, and singular expressions include plural expressions unless the context clearly indicates otherwise. Also, in embodiments of the disclosure, it should be understood that terms such as 'configured', 'include', and 'have' do not preclude the existence or addition possibility of one or more other features or numbers, steps, operations, components, parts, or combinations thereof. In addition, in the embodiment of the disclosure, a 'module' or a 'unit' performs at least one function or operation, and may be implemented in hardware or software, or a combination of hardware and software, and may be integrated into at least one module. In addition, in embodiments of the disclosure, at least one of the plurality of elements refers to not only all of the plurality of elements, but also each one or all combinations thereof excluding the rest of the plurality of elements.

Figure 2:
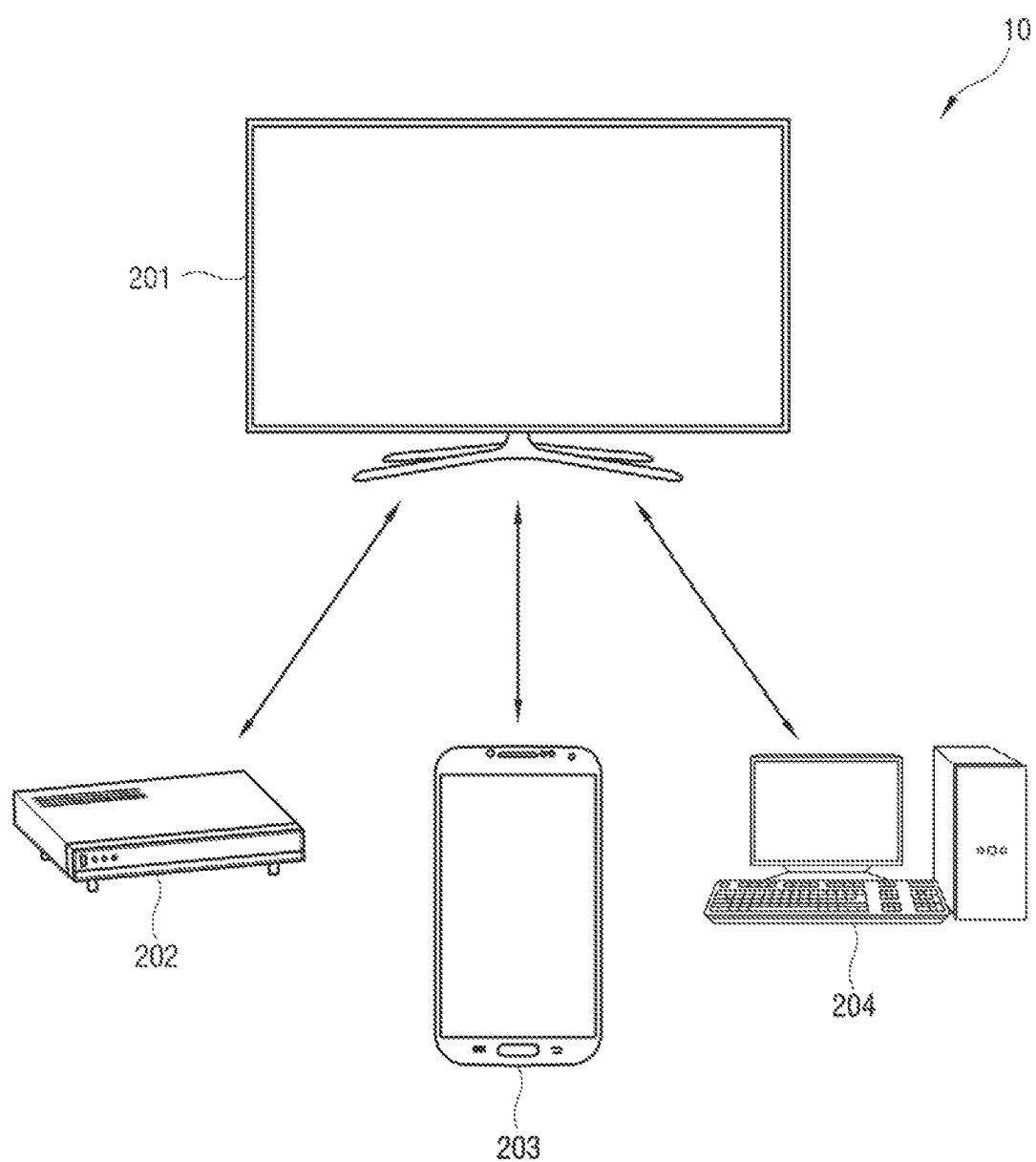
FIG. 2 is a diagram illustrating an example in which a plurality of devices are connected to a network according to an embodiment of the disclosure.

FIG. 1 is a block diagram illustrating a network system according to an embodiment of the disclosure, and FIG. 2 is a diagram illustrating an example in which a plurality of devices are connected to a network according to an embodiment of the disclosure.

As illustrated in FIG. 1, a network system according to an embodiment of the disclosure includes an external network 1 and at least one internal network 10 accessible to the external network 1.

The external network 1 is implemented as a public network such as the Internet, and allocates a public internet protocol (IP) address.

In an embodiment, the internal network 10 is a network address translation (NAT) network, and a public IP address (hereinafter, NAT IP Or NAT Gateway IP) may be allocated to a router 11 operating as a gateway to connect to the external network 1.

The internal network 10 is implemented as a local network, and a unique IP address is allocated to each of the plurality of devices 201, 202, 203, and 204 connected to the internal network 10. In an embodiment, the internal network 10 is implemented in the form of a private network.

The router 11 converts transmission side addresses, that is, unique IP addresses, of packets output from each of the devices 201, 202, 203, and 204 connected to the internal network 10 into a public IP address, and transmits the public IP address. In addition, the router 11 converts a destination address of a response packet to the transmitted packet into the unique IP address of the internal network 10 and transmits the unique IP address to the corresponding device. That is, the devices 201, 202, 203, and 204 connected to the internal network 10 constituted by the NAT appear to be connected to the external network 1 such as the Internet through the public IP allocated to the router 11 from the outside.

The NAT has the advantage of solving the problem of a limited number of public IP addresses by allowing each request that goes out of or enters the network, that is, the internal network 10 to go through an address change process by the above operation. Accordingly, the NAT is a network configuration technique widely used in public institutions or enterprises that require private networks, and many internet service providers (ISPs) companies that provide Internet networks supplied to homes have also used the NAT network structure.

According to the embodiment of the disclosure, the internal network 10 may be implemented in various forms such as a private network of a public institution or an enterprise or a home network of a home. In addition, although FIG. 1 illustrates an example in which there is one internal network 10 connected to the external network 1, the internal network 10 can be implemented in a form in which a plurality of internal networks are connected to the external network 1.

The plurality of devices 201, 202, 203, and 204 connected to the internal network 10 are not limited in their implementation form, and may be implemented as various types of apparatuses capable of wired or wireless communication.

For example, when the internal network 10 is a home network of a home, as illustrated in FIG. 2, each device 201, 202, 203, and 204 may correspond to a display apparatus such as a TV, an image processing apparatus such as a set-top box (STB), a terminal apparatus such as a smart phone, a personal computer (PC) including a laptop or a desktop, or the like, respectively. In addition, each device 201, 202, 203, and 204 may perform wired or wireless communication with the router 11, and the plurality of devices 201, 202, 203, and 204 may be implemented to enable wired or wireless communication with each other.

As illustrated in FIG. 1, the network system according to the embodiment of the disclosure includes an electronic apparatus 100 capable of determining, that is, identifying a device group based on similarity between the plurality of devices 201, 202, 203, and 204 connected to a predetermined network, that is, the internal network 10.

The electronic apparatus 100 according to the embodiment of the disclosure may be implemented in various forms, and includes, for example, a server accessible through a public network such as the Internet. Here, when the electronic apparatus 100 is a server, the server may be implemented in the form of a cloud.

However, in the disclosure, the implementation form of the electronic apparatus 100 is not limited to the server, and for example, the electronic apparatus 100 may include various apparatuses capable of receiving data from the devices 201, 202, 203, and 204 connected to the internal network 10 such as a terminal apparatus or a computer.

In addition, in FIG. 1, the electronic apparatus 100 is illustrated in a form in which the electronic apparatus 100 is directly connected to a public network such as the Internet, that is, an external network 1, but the connection type of the electronic apparatus 100 of the disclosure is limited to that illustrated in FIG. 1. For example, the case where the electronic apparatus 100 is connected to the internal network 10 or is connected to another internal network accessible to the external network 1 is also included in the disclosure.

In addition, the electronic apparatus 100 of the disclosure may receive data from not only the devices 201, 202, 203, 204 connected to the internal network 10, but also other devices of the internal network that can be connected to the external network 1.

Hereinafter, the configuration of the electronic apparatus 100 according to the embodiment of the disclosure will be described with reference to the drawings.

Figure 3:
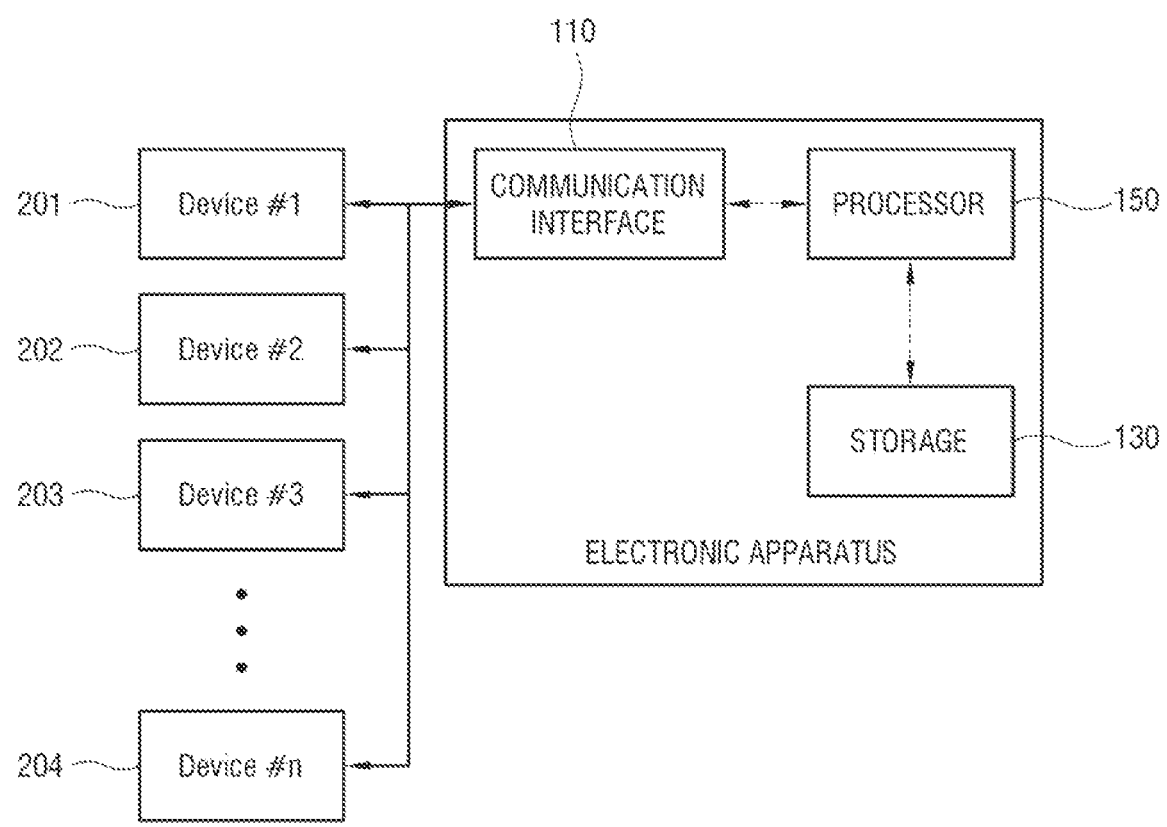
FIG. 3 is a block diagram illustrating a configuration of an electronic apparatus according to an embodiment of the disclosure.
Figure 4:
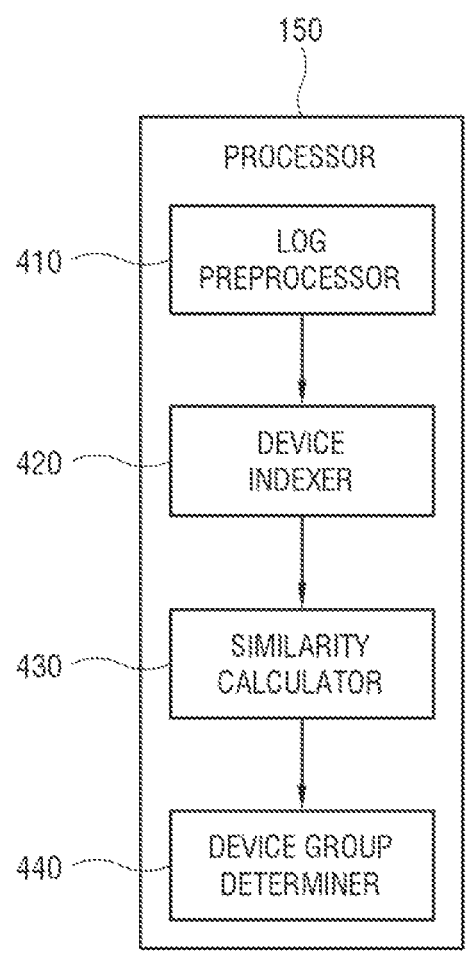
FIG. 4 is a block diagram illustrating a configuration of a processor of the electronic apparatus according to the embodiment of the disclosure.

FIG. 3 is a block diagram illustrating the configuration of the electronic apparatus according to the embodiment of the disclosure. FIG. 4 is a block diagram illustrating a configuration of a processor of the electronic apparatus according to the embodiment of the disclosure.

As illustrated in FIG. 3, the electronic apparatus 100 according to the embodiment of the disclosure includes a communication interface 110, a storage 130, and a processor 150.

The components included in the electronic apparatus 100 are not limited to the above-described embodiment, and may be implemented by excluding or changing some components or including additional other components. For example, when the electronic apparatus 100 is implemented as a computer or a terminal apparatus, the electronic apparatus 100 may further include a display capable of displaying an image. The implementation scheme of the display may be implemented in various types such as liquid crystal, plasma, a light-emitting diode, an organic light-emitting diode, a surface-conduction electron-emitter, carbon nano-tube, and nano-crystal without any limitations.

The communication interface 110 is provided to enable communication with an external apparatus including the plurality of devices 201, 202, 203, and 204 connected to the internal network 10 using a wired or wireless communication method. The communication interface 110 includes a wired and/or wireless communication module.

In an embodiment, the communication interface 110 may be implemented as a communication circuitry including communication modules (S/W module, chip, and the like) corresponding to various kinds of communication protocols. In another embodiment, the communication interface 110 may be implemented as a communication circuitry including a data input/output interface in which the communication modules (S/W module, chip, and the like) corresponding to various types of communication protocols, a port, and the like are combined.

According to an embodiment, the communication interface 110 may include a wired communication module such as Ethernet.

According to an embodiment, the communication interface 110 may include a wireless LAN unit. The wireless LAN unit may transmit/receive data to and from each device 201, 202, 203, and 204 to be communicated through an access point (AP) under the control of the processor 150. The wireless LAN unit includes a Wi-Fi communication module.

According to an embodiment, the communication interface 110 is at least one of short-range communication modules such as Bluetooth, Bluetooth low energy, radio frequency (RF) communication, Wi-Fi direct, Zigbee, ultra wideband (UWB), near field communication (NFC), and the like. The short-range communication module is provided to support direct communication between the electronic apparatus 100 and each device 201, 202, 203, and 204 wirelessly without an AP.

The communication interface 110 of the display apparatus 100 according to the embodiment of the disclosure may be constituted by one or two or more combinations of the wireless LAN unit, the short-range communication module, and the wired communication module depending on performance.

The storage 130 is configured to store various data of the electronic apparatus 100. The storage 130 should store data even when power supplied to the electronic apparatus 100 is cut off, and may be provided as a writable nonvolatile memory (writable memory) to reflect fluctuations. The storage 130 may include at least one of a hard disk (HDD), a flash memory, an EPROM, or an EEPROM.

The storage 130 may further include a volatile memory such as a RAM, and the volatile memory may be provided as a DRAM or an SRAM having a faster read or write speed of the electronic apparatus 100 compared to the nonvolatile memory. That is, in the disclosure, the term storage is defined as terms including not only a nonvolatile memory, but also a volatile memory, a cache memory provided inside the processor 150, and a memory card (for example, micro SD card, memory stick, and the like) that can be mounted on the electronic apparatus 100 through the connection unit 111.

The storage 130 may store input/output signals or data corresponding to the operation of each component under the control of the processor 150. The data stored in the storage unit 130 includes, for example, an operating system for driving the electronic apparatus 100, various applications, image data, additional data, user information, documents, databases, related data, or the like that can be executed on the operating system.

In an embodiment, the storage 130 collects and stores log data received from the plurality of devices 201, 202, 203, and 204, similarity between devices which is calculated using the log data, and data for a device group determined based on the calculated similarity. In addition, the storage unit 130 may install and store an application that operates to calculate the similarity between the devices and determine a device group based on log data of each device.

The processor 150 performs control to operate the overall components of the electronic apparatus 100.

The processor 150 of the electronic apparatus 100 according to the embodiment of the disclosure may receive log data of the plurality of devices 201, 202, 203, and 204 connected to a predetermined network through the communication interface 110, obtain operation time information of each device 201, 202, 203, and 204 from the received log data, calculate the similarity of the operation time between the plurality of devices 201, 202, 203, and 204 based on the acquired operation time information, and determine (identify) a device group including two or more devices with the relatively high calculated similarity among the plurality of devices 201, 202, 203, and 204.

Here, the network to which the plurality of devices 201, 202, 203, and 204 are connected is the internal network 10 constituted by the NAT, and the processor 170 may classify and group the devices 201, 202, 203, and 204 existing in a network one level lower than the public IP allocated to the internal network 10 based on locality sensitive.

The processor 150 includes at least one general-purpose processor that loads at least a part of the control program from the nonvolatile memory in which the control program is installed into the volatile memory and executes the loaded control program, and may be implemented as, for example, a central processing unit (CPU), an application processor (AP), or a microprocessor.

The processor 150 may be implemented in the form in which one or more cores consisting of a single core, a dual core, a triple core, a quad core, or multiples thereof are mounted. The processor includes a plurality of processors, for example, a main processor and a sub processor operating in a sleep mode (for example, a standby mode in which only standby power is supplied and the electronic apparatus does not operate). In addition, the processor, the ROM, and the RAM may be interconnected via an internal bus. In an embodiment, the processor 150 may be implemented as a form included in a main SoC mounted on a PCB embedded in the display apparatus 100.

The control program may include a program(s) implemented in at least one of a BIOS, a device driver, an operating system, firmware, a platform, and an application program (application). As an embodiment, the application program may be pre-installed or stored in the electronic apparatus 100 at the time of manufacturing of the electronic apparatus 100, or installed in the electronic apparatus 100 based on data of the application program received from the outside when used later. The data of the application program may be downloaded to the electronic apparatus 100 from an external server such as an application market. Such an external server is an example of a computer program product of the disclosure, but is not limited thereto.

As an embodiment, the operation of the processor 150 as described above may be implemented as a computer program stored in a computer program product (not illustrated) separately provided from the electronic apparatus 100.

In this case, the computer program product includes a memory in which an instruction corresponding to the computer program is stored, and a processor. When executed by the processor, the instruction may perform the operation of the processor 150 by receiving the log data of each device 201, 202, 203, and 204, obtaining the operation time information of each device 201, 202, 203, and 204 from the received log data, calculating the similarity of the operation time between the plurality of devices 201, 202, 203, and 204 based on the acquired operation time information, and determining the device group including two or more devices with the relatively high calculated similarity among the plurality of devices 201, 202, 203, and 204.

As a result, the electronic apparatus 100 may download and execute the computer program stored in the separate computer program product to perform the operation of the processor 150.

In addition, as an embodiment, the operation of the processor 150 may be implemented as a computer-readable program which is stored in a recording medium. The program stored in the recording medium, that is, data, is directly accessed and executed by the processor 150, or downloaded and executed to the electronic apparatus 100 through a transmission medium implemented through a wired/wireless network to which a computer system is interconnected, thereby performing an operation.

In the electronic apparatus 100 according to the embodiment of the disclosure, as illustrated in FIG. 4, the processor 150 may include a log preprocessor 410, a device indexer 420, a similarity calculator 430, and a device group determiner 440.

Each of the components 410, 420, 430, and 440 of the processor 150 as described above or a combination of two or more thereof may be implemented by a software module or a combination of a hardware module and a software module, or may be implemented by the computer program described above. Hereinafter, it will be understood that the operation performed by the log preprocessor 410, the device indexer 420, the similarity calculator 430, and the device group determiner 440 is performed by the processor 150.

Hereinafter, a process of calculating the similarity between devices and determining a device group performed according to the embodiment of the disclosure will be described in detail with reference to the drawings.

Figure 5:
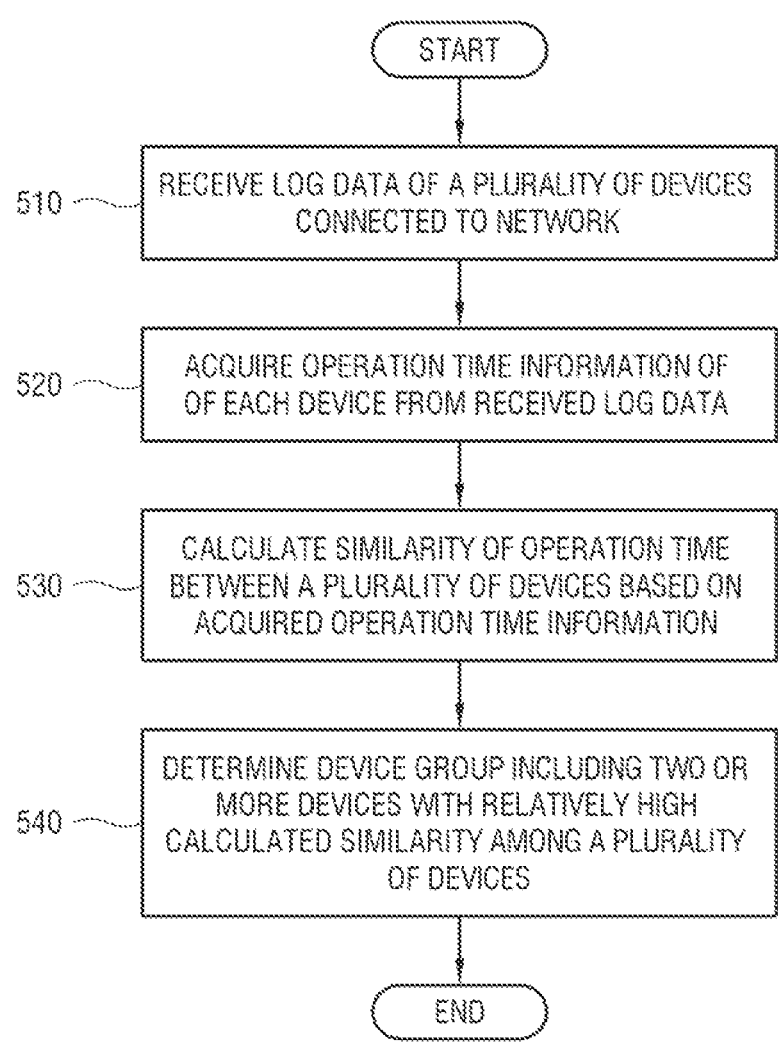
FIG. 5 is a flowchart illustrating a method of controlling an electronic apparatus according to an embodiment of the disclosure.

FIG. 5 is a flowchart illustrating a method of controlling an electronic apparatus according to an embodiment of the disclosure.

As illustrated in FIG. 5, the electronic apparatus 100 receives the log data of the plurality of devices 201, 202, 203, and 204 connected to an arbitrary network, for example, the internal network 10 of FIG. 1 through the communication interface 110 (510). In an embodiment, the processor 150 may periodically receive, that is, collect, log data from each device 201, 202, 203, and 204 according to a predetermined time (for example, 6 hours, 12 hours, 24 hours, and the like).

The processor 150 acquires the operation time information of each device from the log data received in step 510 (520). In an embodiment, the processor 150 may acquire the operation time information of each device by extracting a timestamp of each device from log data and generating a time index from the extracted timestamp.

Figure 8:

FIGS. 6 to 8 are diagrams for explaining a process of acquiring operation time information of a device in the electronic apparatus according to the embodiment of the disclosure.

The processor 150 preprocesses the log data of each device 201, 202, 203, and 204 received in step 510. Here, the preprocessing of the log data may be performed by the log preprocessor 410 illustrated in FIG. 4, and the preprocessing may include network log aggregation.

Specifically, the log preprocessor 410 may extract operation data of each device by performing preprocessing on the log data collected in step 510. The operation data extracted according to the preprocessing may include timestamps 601, 602, and 603 as time values, and as illustrated in FIG. 6, the extracted timestamps 601, 602, and 603 may match the identification information (identifier, ID) and IP address (NAT Gateway IP) of each device and may be stored in the storage 130.

As illustrated in FIG. 6, the timestamp represents a specific time as a character string, and the date and time when log data is generated or changed in the matched device may be checked using the timestamp.

The timestamps 601, 602, and 603 extracted by the log preprocessor 410 are output to the device indexer 420.

The device indexer 420 generates a time index from the timestamps 601, 602, and 603 received from the log preprocessor 410. The generated time index may appear as compressed time slots 701, 702, and 703, as illustrated in FIG. 7.

As illustrated in FIG. 7, the time index, that is, the compressed time slots 701, 702, and 703 may match the device ID and IP address (NAT Gateway IP), which are identification information (identifier, ID) of each device, and may be stored in the storage 130.

In an embodiment, the compressed time slot is generated by compressing time data into a bitmap in a predetermined time unit (for example, 30 minutes, 1 hour, 2 hours, and the like). The value of the compressed timeslot generated in the indexing step is operation time information representing a time zone in which each device 210, 202, 203, and 204 connected to the internal network 10 operates, that is, an appearance time zone, which becomes a value representing the locality sensitive of the device.

For example, when one timeslot is defined as 1 hour, as illustrated in FIG. 8, it may be confirmed at timeslots 00:00, 3:00, 5:00, 10:00, 14:00, and 20:00 having a value of 1 that the device has operated.

The processor 150 calculates the similarity of the operation time between the plurality of devices 201, 202, 203, and 204 based on the operation time information acquired in step 520 (530).

Figure 9:
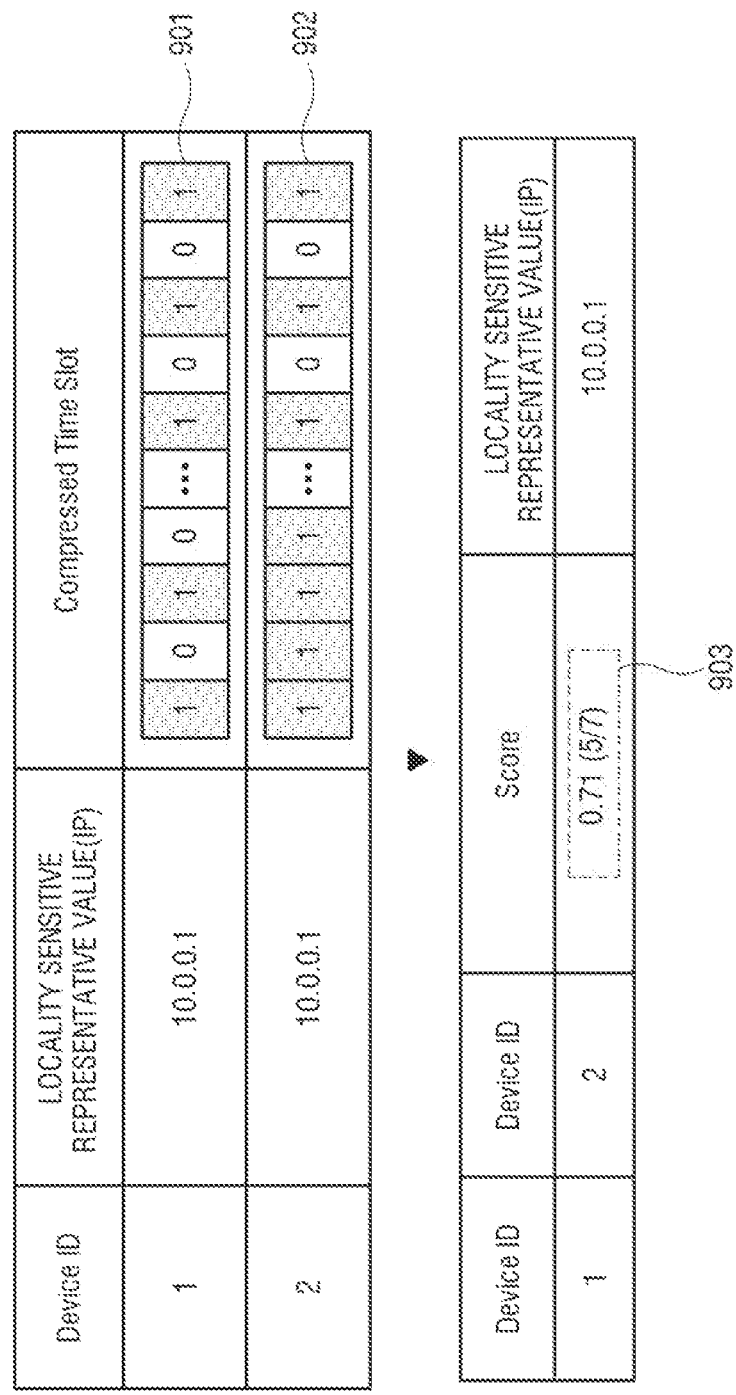

FIGS. 9 and 10 are diagrams for explaining a process of calculating similarity of an operation time between devices in the electronic apparatus according to the embodiment of the disclosure.

The processor 150 may calculate the similarity between the plurality of devices 201, 202, 203, and 204 based on the operation time information acquired in step 520, that is, the compression time slot representing the time index. Here, the calculation of the similarity between devices may be performed by the similarity calculator 430 illustrated in FIG. 4, and the calculation process of the similarity may include locality sensitive device similarity prediction.

In an embodiment, the similarity calculator 430 may calculate the similarity between the plurality of devices using a predetermined similarity calculation method. The method used for calculating the similarity in the disclosure is not limited, and for example, jaccard similarity or cosine similarity may be used.

The jacquard similarity has a value between 0 and 1, and the higher the similarity is, the closer it is to 1, and the lower the similarity is, the closer it is to 0.

In an embodiment of the disclosure, when the similarity has a predetermined reference value, for example, 0.5 or greater, it is determined that the corresponding device pair has similar locality sensitive.

In an embodiment, the similarity calculator 430 calculates similarity between a plurality of devices having a specific locality sensitive representative value, that is, devices in a network to which the same public IP is allocated.

For example, referring to FIG. 9, the similarity calculator 430 may derive a jaccard score 903 based on a compressed time slot 901 which is operation time information of a first device (Device ID 1) connected to the internal network 10 to which public IP 10.0.0.1 is allocated and a compressed time slot 902 which is operation time information of a second device (Device ID 2), thereby calculating the similarity between the first device (Device ID 1) and the second device (Device ID 2).

As illustrated in FIG. 9, when the score 903 derived for the first device (Device ID 1) and the second device (Device ID 2) is 0.71, the score 903 has a value close to 1, and therefore, both the devices has similarity (similar locality sensitive) to each other.

The similarity calculator 430 may calculate the similarity between the devices 201, 202, 203, and 204 with respect to each of the other devices in the same manner as described above.

For example, as illustrated in FIG. 10, when the score derived for the first device (Device ID 1) and the second device (Device ID 2) is 0.71 and the score for the second device (Device ID 2) and the third device (Device ID 3) is 0.3, it may be seen that the second device (Device ID 2) has mutual similarity (similar locality sensitive) to the first device (Device ID 1) (score 0.71), and does not have mutual similarity (similar locality sensitive) to the third device (Device ID 3) (score 0.3). In other words, the second device (Device ID 2) and the first device (Device ID 1) form a device pair having relatively high similarity.

In addition, when the score derived for the first device (Device ID 1) and the third device (Device ID 3) is 0.5, the first device (Device ID 2) has similar locality sensitive to the second device (Device ID 2) (score 0.71) and has also similar locality sensitive to the third device (Device ID 3) (score 0.5). However, the first device (Device ID 1) has relatively higher similarity to the second device (Device ID 2), and has relatively lower similarity to the third device (Device ID 3).

The processor 150 determines (identifies) a device group including two or more devices with the relatively high calculated similarity among the plurality of devices based on the similarity calculated in step 530 (540). Here, the determination of the device group may be performed by the device group determiner 440 illustrated in FIG. 4.

Figure 11:
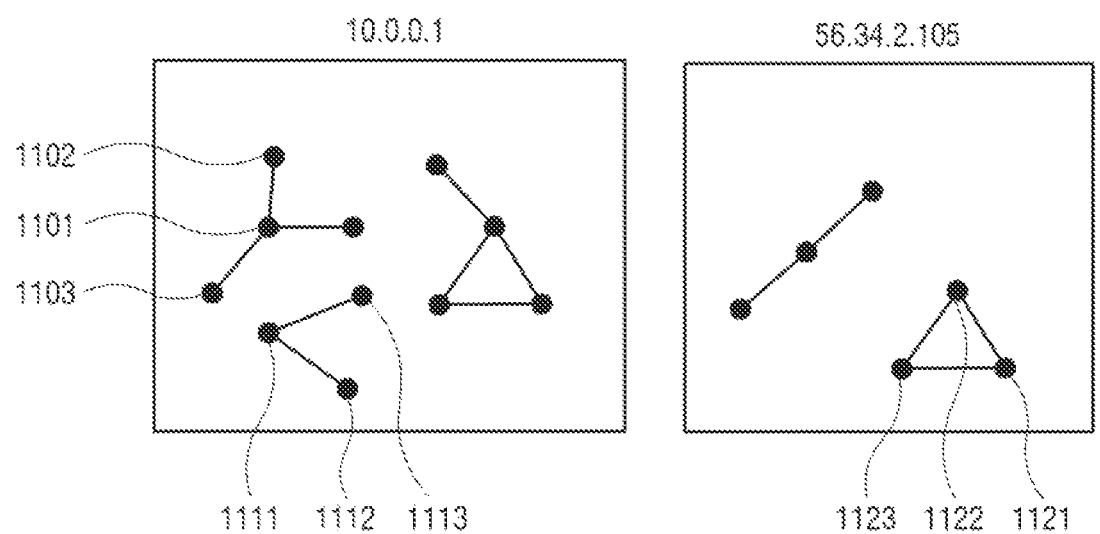
Figure 12:
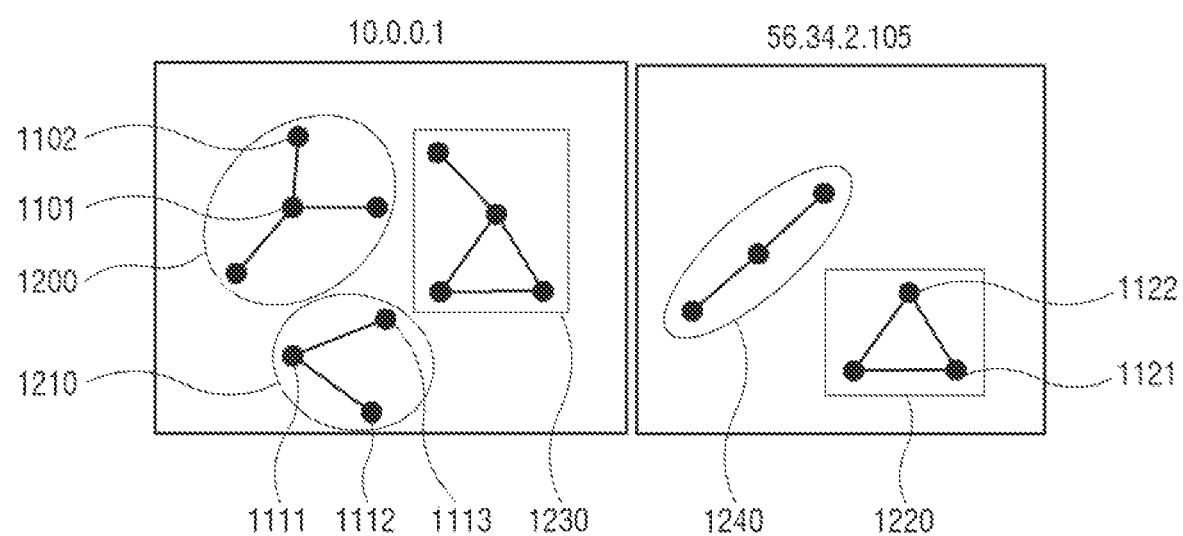

FIGS. 11 to 13 are diagrams for explaining a process of determining a device group in the electronic apparatus according to the embodiment of the disclosure.

Specifically, the device group determiner 440 extracts a group of device pairs having relatively high similarity based on the mutual similarity score calculated in step 530, for example, the Jacquard score. Here, the device group determiner 440 may selectively extract a device pair having a predetermined reference score, for example, a jaccard score of 0.5 or greater. In other words, the device group determiner 440 may consider that a device pair (for example, the second device (Device ID 2), the third device (Device ID 3) 1010, and a fourth device (Device ID 4), and a sixth device (Device ID 6) 1020 of FIG. 10) having a score having a value smaller than a reference score (for example, jaccard score of 0.5) has an insignificant value, and may remove the device pair from the device group having similarity.

In step 540, the device group determiner 440 may generate an image to represent a device group extracting a device pair having similarity equal to or greater than the reference score as described above as a graph. Here, the generated image may be represented as a graph in which two or more devices having relatively high similarity are connected to each other in the device group.

In an embodiment, the device group determiner 440 may include a graph-based cluster generator that generates an image.

The device group determiner 440 may connect between objects corresponding to a device pair derived as having mutual similarity of a reference score (for example, a jaccard score of 0.5) or greater among devices of a network to which the locality sensitive representative value, for example, the public IP 10.0.0.1 is allocated.

As illustrated in FIG. 11, the device group determiner 440 may connect an object 1101 to the first device (Device ID 1) derived as having mutual similarity to an object 1101 corresponding to the second device (Device ID 2) and connect the object 1101 corresponding to the first device (Device ID 1) to an object 1103 corresponding to the third device (Device ID 3) in FIG. 10, for example. In the same way, the device group determiner 440 connects between objects 1111, 1112, and 1113 corresponding to devices derived as having mutual similarity.

In addition, the device group determiner 440 may connect between objects 1122, 1121, and 1123 corresponding to devices derived as having mutual similarity of a reference score (for example, a jaccard score of 0.5) or greater among devices of a network to which the locality sensitive representative value, for example, the public IP 56.34.2.105 is allocated.

In FIG. 11, devices corresponding to respective vertices (objects) connected by trunk lines have an operation time within a predetermined network (for example, internal network 10) having a specific locality representative value (using the same public IP), and therefore, is interpreted as forming subgroups with similar common frequency of appearance.

The device group determiner 440 may generate a device group, that is, a cluster including devices connected to each other having similar operation times as described above.

For example, in the network using IP 10.0.0.1, a device group 1200 including devices (the first device (Device ID 1), the second device (Device ID 2), and the third device (Device ID 3) in FIG. 10) corresponding to objects 1101, 1102, and 1103 connected by trunk lines is generated as illustrated in FIG. 12. In the same way, a device group 1210 including devices corresponding to the objects 1111, 1112, and 1113 connected by trunk lines may be generated.

The device group determiner 440 may also generate a device group 1220 including devices corresponding to objects 1121, 1122, and 1123 connected by trunk lines in a network using IP 56.34.2.105.

FIG. 12 illustrates that three device groups 1200, 1210, and 1230 are determined based on the mutual similarity of the operation time in the network using IP 10.0.0.1, and FIG. 13 illustrates, for example, the case where two device groups 1220 and 1240 are determined based on mutual similarity of operation time in the network using IP 56.34.2.105. In this case, in the disclosure, the number of device groups generated in each network and the number of devices included are not limited.

The graphs represented as in FIGS. 11 and 12 may be displayed through a display of the electronic apparatus 100 itself or a display of at least one external apparatus that can be connected through the communication interface 110.

The device group determiner 440 assigns a cluster ID to each of the device groups determined as described above, and manages a plurality of devices included in the corresponding device group.

For example, as illustrated in FIG. 13, the device group determiner 440 may assign a cluster ID 1 to the first device group including a plurality of devices corresponding to device IDs 1, 4, 6, 2, and 3, respectively and assign a cluster ID 2 to the second device group including a plurality of devices corresponding to device IDs 2, 3, 5, and 1, respectively, in the network including IP 10.0.0.1, thereby managing the plurality of devices included in the corresponding device group.

In addition, the device group determiner 440 may assign a cluster ID 3 to a third device group including a plurality of devices corresponding to device IDs 2 and 3, respectively, and assign a cluster ID 3 to the fourth device group including a plurality of devices corresponding to devices ID 6, 1, and 5, respectively, in the network using IP 56.34.2.105, thereby managing the plurality of devices included in the corresponding device group.

The electronic apparatus 100 according to the embodiment of the disclosure may acquire operation time information for a plurality of devices connected to a predetermined network as described above, calculate the similarity of the operation time between devices based on the operation time information, and determine the device group including two or more devices with relatively high calculated similarity, thereby understanding the relationship between the devices connected to the internal network that are difficult to identify from the outside, that is, the similarity, using the probability of big data and the graph theory based on the use of the same time zone.

In the embodiment of the disclosure as described above, the NAT network structure has been described as an example of configuring the predetermined network, that is, the internal network 10, but the disclosure is not limited thereto. Therefore, in the case of the plurality of devices connected to the internal network 10 having the locality sensitive representative value in a certain form other than the IP of the NAT, it may be implemented to determine a lower group (device group) based on similarity from an upper group having the locality sensitive representative value as in the disclosure.

In addition, the embodiment of the disclosure has described, for example, the case where the operation time information based on the log data of each device, that is, the compressed time slot, is used as the index for calculating the similarity. However, since the disclosure is not limited to using the operation time information, it can be implemented to predict the similarity between devices using various kinds and types of data/information.

In addition, the embodiment of the disclosure has described, for example, the case of using the ID of each device as an identification means for distinguishing each device connected to the network, but other information for distinguishing a plurality of devices other than the device ID, for example, the device type, the model name, or the like can be processed and used.

In addition, the device group determined in the embodiment of the disclosure may be utilized for a target service for marketing by understanding the configuration, usage pattern, and the like of devices having similarity in the internal network such as a home or a company based thereon.

Hereinabove, the disclosure has been described in detail through the preferred embodiments, but the disclosure is not limited thereto and may be implemented in various ways within the scope of the claims.

The invention claimed is:

1. An electronic apparatus, comprising:
a communication interface; and
a processor configured to receive log data of a plurality of devices connected to a network through the communication interface, the network corresponding to an internal private network to which a public IP address is allocated,
acquire operation time information of each of the devices from the received log data, the operation time information corresponding to a time index based on the log data of each of the plurality of devices,
calculate similarity of the operation time between the plurality of devices based on the acquired operation time information, and
determine a device group including two or more devices among the plurality of devices in which the calculated similarity of the operation time between the two or more devices is equal to or greater than a predetermined reference value,
wherein the processor is configured to determine the device group by generating a graph-based cluster in which the two or more devices are connected to each other, the device group being utilized for a predetermined target service.

2. The electronic apparatus of claim 1, wherein the processor is configured to extract a timestamp of each of the devices from the received log data, and generate the time index indicating the operation time information from the extracted timestamp.

3. The electronic apparatus of claim 2, wherein the time index includes a bitmap-based compressed time slot.

4. The electronic apparatus of claim 1, wherein the calculated similarity has a value between 0 and 1.

5. The electronic apparatus of claim 4, wherein the processor is configured to determines the device group including a corresponding device when the calculated similarity of the operation time between the plurality of devices is equal to or greater than the predetermined reference value.

6. The electronic apparatus of claim 4, wherein the processor is configured to remove corresponding device from the device group when the calculated similarity of the operation time between the plurality of devices is smaller than the predetermined reference value.

7. The electronic apparatus of claim 1, wherein the processor is configured to provide an image represented by the graph based cluster in which the two or more devices are connected to each other to at least one external apparatus through the communication interface.

8. The electronic apparatus of claim 7, further comprising:
a display configured to display the image represented by the graph.

9. The electronic apparatus of claim 8, wherein the display shows the graph as two or more nodes respectively representing two or more of the plurality of devices, interconnected by one or more lines representing the degree of similarity between the two or more devices.

10. A method of controlling an electronic apparatus, comprising:
receiving log data of a plurality of devices connected to a network through a communication interface, the network corresponding to an internal private network to which a public IP address is allocated;
acquiring operation time information of each of the devices from the received log data, the operation time information corresponding to a time index based on the log data of each of the plurality of devices;
calculating similarity of the operation time between the plurality of devices based on the acquired operation time information; and
determining a device group including two or more devices among the plurality of devices in which the calculated similarity of the operation time between the two or more devices is equal to or greater than a predetermined reference value,
wherein the determining the device group comprises generating a graph-based cluster in which the two or more devices are connected to each other, the device group being utilized for a predetermined target service.

11. The method of claim 10, wherein the acquiring of the operation time information includes:
extracting a timestamp of each of the devices from the received log data; and
generating the time index indicating the operation time information from the extracted timestamp, wherein the time index includes a bitmap-based compressed time slot.

12. The method of claim 10, wherein the calculated similarity has a value between 0 and 1.

13. The method of claim 12, wherein the determining of the device group includes determining the device group including a corresponding device when the calculated similarity of the operation time between the plurality of devices is equal to or greater than the predetermined reference value.

14. The method of claim 12, wherein the determining of the device group includes removing a corresponding device from the device group when the calculated similarity of the operation time between the plurality of devices is smaller than the predetermined reference value.

15. The method of claim 10, further comprising displaying a graph as two or more nodes respectively representing two or more of the plurality of devices, interconnected by one or more lines representing the degree of similarity between the two or more devices.

* * * * *